United States Patent [19]
Fujii et al.

[11] 4,434,205
[45] Feb. 28, 1984

[54] ARTIFICIAL LEATHERS

[75] Inventors: Shigeo Fujii; Tokuzo Ikeda; Takashi Mikami; Shuji Okano, all of Saitama, Japan

[73] Assignee: Toa Nenryo Kogyo Kabushiki Kaisha, Tokyo, Japan

[21] Appl. No.: 401,290

[22] Filed: Jul. 22, 1982

Related U.S. Application Data

[63] Continuation of Ser. No. 203,772, Nov. 3, 1980, abandoned, which is a continuation-in-part of Ser. No. 167,637, Dec. 21, 1979, Pat. No. 4,375,446, and Ser. No. 167,638, Dec. 21, 1979, abandoned.

[30] Foreign Application Priority Data

Nov. 1, 1979 [JP] Japan ................... 54-14044

[51] Int. Cl.³ ............................................. B32B 7/02
[52] U.S. Cl. ................................... 428/218; 428/219; 428/220; 428/233; 428/234; 428/235; 428/284; 428/286; 428/297; 428/298; 428/299; 428/300; 428/301; 428/340; 428/423.1; 428/904

[58] Field of Search ............... 428/218, 219, 220, 233, 428/234, 235, 284, 286, 287, 290, 297, 298, 299, 300, 301, 340, 904, 423.1

[56] References Cited

U.S. PATENT DOCUMENTS 4,146,663  3/1979  Ikeda et al. .................. 428/904

FOREIGN PATENT DOCUMENTS 43-12631   5/1968  Japan .
635694     4/1950  United Kingdom .
938260    10/1963  United Kingdom .
942455    11/1963  United Kingdom .
986357     3/1965  United Kingdom .
1136806   12/1968  United Kingdom .
1581486   12/1980  United Kingdom .

Primary Examiner—James J. Bell
Attorney, Agent, or Firm—W. T. Clarke; M. B. Kurtzman

[57] ABSTRACT

An artificial leather is made by impregnating a special nonwoven web substrate with an elastic polymer material. In another embodiment the substrate comprises a nonwoven fabric laminated to a woven or nonwoven fabric.

21 Claims, 14 Drawing Figures

ARTIFICIAL LEATHERS

This is a continuation, of application Ser. No. 203,772, filed Nov. 3, 1980, now abandoned, which is a CIP of Ser. No. 167,637, filed Dec. 12, 1979 now U.S. Pat. No. 4,375,446 and Ser. No. 167,638, filed Dec. 21, 1979, abandoned.

This invention relates to an artificial leather, and more particularly, to an artificial leather having a polymer filling the interstices in the tissues of a substrate comprising a three-dimensionally intertwined nonwoven fabric formed by fine fibers and having a specific structure.

Most of the artificial leathers known in the art comprise a needle punched nonwoven fabric impregnated with an elastic polymer such as polyurethane. They are widely different in various aspects from natural leathers, because the properties of the nonwoven fabric forming their substrate are extremely inferior to those of natural leathers.

This invention removes these problems, and provides an artificial leather which comprises a substrate formed by a nonwoven fabric of very fine single fibers having a specific cross-sectional structure, which is as soft, flexible, thin and strong as natural leathers, and which has a suede-like or grained surface suited for making clothes, shoes, bags, or the like.

Thus, this invention consists essentially in (1) an artificial leather comprising a polymer supported in a nonwoven fabric or a compressed form thereof, the nonwoven fabric being composed of a plurality of stacked and intertwined long fibers defining one of cross-sectional planes extending between one surface of the nonwoven fabric or a part thereof, and another surface of the nonwoven fabric or a part thereof, and (2) an artificial leather comprising a polymer supported in a nonwoven fabric laminate obtained by laminating a woven or nonwoven fabric on a nonwoven fabric or a compressed form thereof, and if required, compressing the resulting laminate, the latter mentioned nonwoven fabric being composed of a plurality of stacked and intertwined long fibers defining one of cross-sectional planes extending between one surface of the latter mentioned nonwoven fabric or a part thereof, and another surface of the latter mentioned nonwoven fabric or a part thereof.

The invention will be better understood from the following description with reference to the drawings, wherein:

FIGS. 1(a) and (b) are each a cross-sectional view schematically showing an artificial leather embodying this invention, and comprising a substrate formed by a nonwoven fabric of very fine single fibers;

FIGS. 2(a) and (b) are each a cross-sectional view schematically showing an artificial leather embodying this invention, and comprising a substrate formed by laminating a woven fabric to a nonwoven fabric of very fine single fibers;

Figure 3:
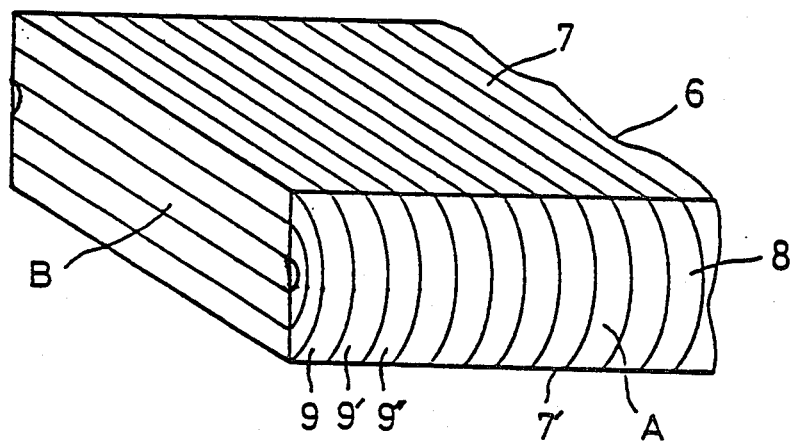
FIG. 3 is a schematic view showing the nonwoven fabric used for this invention.
Figure 6:
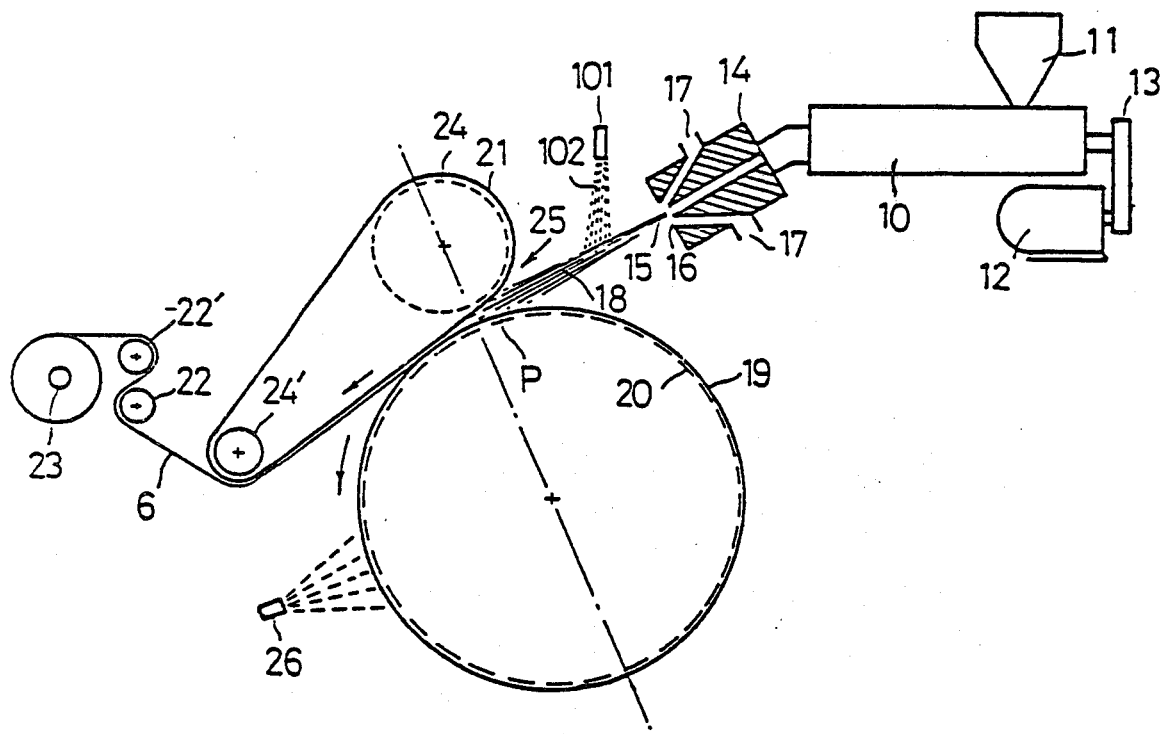
Figure 7:
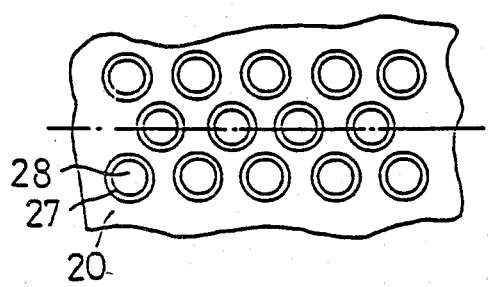
Figure 8:
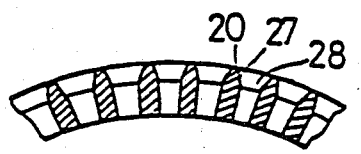
Figure 9:
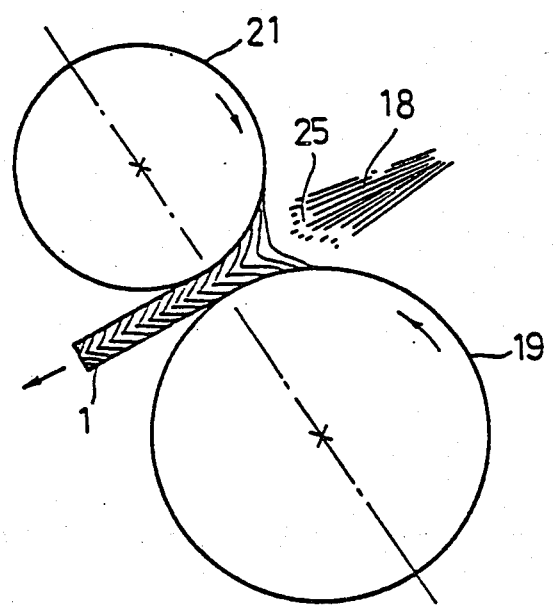

FIGS. 5(a) to (d) illustrate various forms of the nonwoven fabric for this invention at plane A in FIG. 3;

FIG. 6 is a detailed view illustrating a method of manufacturing the nonwoven fabric used for this invention;

FIGS. 7 and 8 are views describing the apertures with which the side wall of the drum 20 supporting the collector 19 shown in FIG. 6 is pierced; and FIG. 9 is a view illustrating the process in which the nonwoven fabric is formed by the method shown in FIG. 6.

The invention will now be described more specifically with reference to the drawings.

Figure 1A:
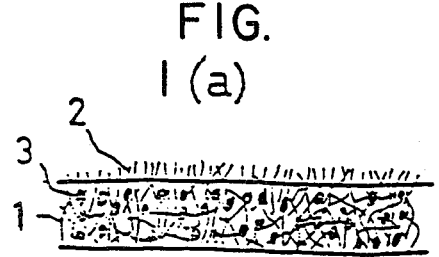
Figure 1B:
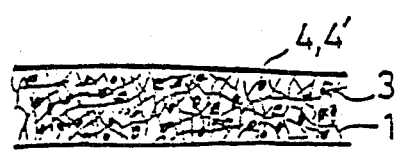
Figure 2A:
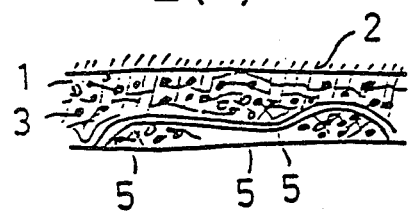
Figure 2B:
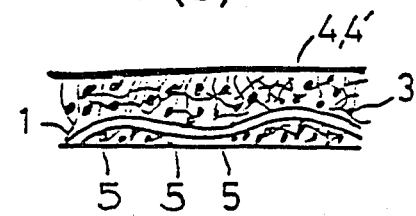

The artificial leather of this invention has such a cross-sectional structure as shown in FIG. 1 at (a) and (b). FIG. 1, at (a), shows a suede-like artificial leather formed by very fine three-dimensionally intertwined single fibers 1, including a polymer 3 filling the interstices in the tissue formed by the intertwined fibers 1, and having a surface defined by a densely raised mass of fluff 2 resembling fine soft hair. FIG. 1(b) shows a grained artificial leather formed by very fine three-dimensionally intertwined single fibers 1, including a polymer 3 filling the intertices in the tissue formed by the intertwined fibers 1, and having a surface provided with a foamed layer 4 or finely porous layer 4' of an elastic polymer such as a polyurethane elastomer. FIGS. 2(a) and (b) show artificial leathers which are similar to those shown at (a) and (b), respectively, of FIG. 1, but which comprise a substrate formed by very fine single fibers 1 and a woven fabric 5 which are intertwined together. Thus, the artificial leather of this invention is featured by the very fine three-dimensionally intertwined fibers defining the substrate, the densely and uniformly fluffy surface layer, and the polymer filling the interstices of the intertwined fibers. These features make the artificial leather of this invention as soft, flexible, thin and strong as a natural leather. The artificial leather of this invention can be obtained if its substrate comprises a nonwoven fabric having a specific structure as will hereunder be described.

The nonwoven fabric used for this invention will now be described with reference to the drawings. FIG. 3 schematically shows the nonwoven fabric used for this invention. In FIG. 3, numerals 7 and 7' denote the opposite surfaces of a nonwoven fabric 6, letter A indicates one cross-sectional plane extending between one surface 7 or a part thereof and the other surface 7' or a part thereof (which for the sake of convenience will hereinafter be called the longitudinal sectional plane), and letter B indicates another cross-sectional plane extending between the surface 7 or a part thereof and the surface 7' or a part thereof (which will hereinafter be called the transverse sectional plane). Numeral 8 denotes an intermediate fibrous layer disposed between the surfaces 7 and 7', and composed of a plurality of long fibers which are intertwined and stacked together. Numerals 9, 9', 9'' indicate thin layers each composed of intertwined long fibers. The thin layers 9, 9', 9'', are actually continously combined with one another, and cannot be distinguished from one another as clearly as shown in FIG. 3, which is a schematic view provided for the convenience of illustration. However, as it is possible to divide the fabric into such layers each having a desired thickness, FIG. 3 shows the fabric as if it were composed of clearly distinguishable layers.

Figure 4:
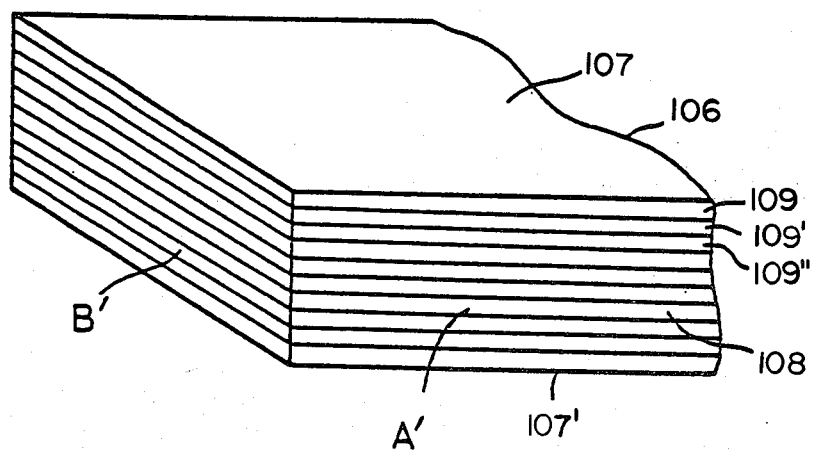
FIG. 4 is a schematic view showing a nonwoven fabric known in the art.

FIG. 3 shows the thin layers 9, 9', 9'' which cooperate with one another to define the surfaces 7 and 7' of the nonwoven fabric 6. This features makes the nonwoven fabric of this invention completely different from any known nonwoven fabric having such thin layers 109, 109', 109'' lying substantially in parallel to its surfaces 107 and 107' as shown in FIG. 4.

The thin layers 9, 9', 9" shown in FIG. 3 are each formed by a plurality of long fibers intertwined and collected on the surfaces. In other words, the thin layers are of the same construction as in the nonwoven fabrics known in the art. Accordingly, the nonwoven fabric of this invention is characterized by the single fibers lying together along the thickness of the fabric. The single fibers forming each of the thin layers are intertwined, and connected to the surfaces 7 and 7' to define them.

The structure of the nonwoven fabric used for this invention has been schematically shown in FIG. 3; embodiments of the nonwoven fabric of the invention are shown in FIG. 5 at (a) to (d), which illustrate various configurations in the plane A of FIG. 3.

The nonwoven fabric for this invention constructed as hereinabove described usually has a thickness of 0.5 to 100 mm, and a basis weight of 5 to 2,000 g/m$^2$, preferably 200 to 400 g/m$^2$. It is preferably prepared from very fine fibers having a diameter usually in the range of 0.1 to 30$\mu$, preferably in the range of 1 to 20$\mu$ and more preferably in the range of 3 to 7$\mu$. The average diameter of the very fine single fibers is an important factor for artificial leathers, particularly of the suede type. If an artificial leather having long fluff, and resembling a suede or velour is prepared by using fibers having an average diameter which is less than 3$\mu$, the fluff is easily broken, and the leather fails to be sufficiently high in wear resistance. If, on the other hand, fibers having an average diameter exceeding 7$\mu$ are used, it is impossible to obtain a soft artificial leather having a surface covered with dense fluff, and demonstrating excellent chalkiness.

Although the nonwoven fabric for this invention can be made of any material without any limitation in particular, it is desirable to prepare it from fibers of a thermoplastic resin. Examples of the thermoplastic resin which can be used include polyolefins such as homopolymers of ethylene, propylene, butene-1, 4-methylpentene-1, or other α-olefins, copolymers thereof, and the mixtures of those polymers, polyamides such as nylon 6, nylon 66, nylon 612, nylon 12 (trade or common names), and their mixtures, polyesters such as polyethylene, terephthalate, polybutylene terephthalate and polyurethane, particularly thermoplastic polyurethane, ethylene-vinyl acetate copolymers, ethylenemethacrylic acid ester copolymers, and graft copolymers of polyolefins with unsaturated carboxylic acids or their derivatives. It is also possible to use any mixture of these thermoplastic resins.

The nonwoven fabric for this invention may be manufactured by various methods. It is possible to prepare the surface layer 7 and the fibrous layer 8 separately, and combine them together, but it is more desirable to form them as an integral assembly in a single stage of operation. A preferred method for making the nonwoven fabric for this invention will be described hereunder by way of example.

Referring to FIG. 6, a thermoplastic resin is fed into an extruder 10 through its hopper 11, and kneaded in a hot, molten state therein by a screw (not shown) driven by an electric motor 12 and a power transmission mechanism 13. The thermoplastic resin is, then, fed through a die 14 provided on the extruder 10, and is continuously spun through spinning holes 15 in the die 14. The die 14 is provided on both sides thereof adjacent thereto with gas emitting ports 16 communicating with gas feeding tubes 17. A high pressure gas supplied through the gas feeding tubes 17 for the die 14 is blown out through the gas emitting ports 16 at a speed which is close to that of sound. The thermoplastic resin spun through the spinning holes 15 is divided into fine fibers by the gas discharged through the gas emitting ports 16 at such a high speed, thereby forming a stream of fibers 18 with the gas. If desired, a liquid drop supplying unit (e.g., an ultrasonic spray) 101 is provided for supplying liquid drops 102 toward the fiber stream 18. After the fiber stream 18 is contacted with such liquid drops, it is blown against a fiber impinging portion P of a collector 19. The collector 19 is disposed about the surface of a hollow cylindrical drum 20 pierced with a multiplicity of aperatures 28 each having a tapered cross-section 27 as shown in FIGS. 7 and 8. The fibers blown against the surface of the collector 19 are separated from the fiber stream 18, and form a nonwoven fabric 6. The nonwoven fabric thus formed is compressed between the collector 19 and a presser 21 into a predetermined thickness, and wound about a winder 23 after passing around roles 22 and 22'. The presser 21 comprises a net or porous plate of the same nature as that of which the collector 19 is made, which net or porous plate extends about drums 24 and 24' of the same nature with the drum 20. A fiber collecting zone 25 is defined between the collector 19 and the presser 21. A spray 26 is provided, if desired, for supplying a cooling fluid to the collector 19. The liquid drops 102 may be selected appropriately from among water, an aqueous solution and a suspension according to the purpose involved, though it is not essential to supply such liquid drops.

The nonwoven fabric for this invention can be manufactured efficiently by the method as hereinabove described. FIG. 9 schematically illustrates the process by which the nonwoven fabric is formed from fibers. When the fiber stream 18 formed by a plurality of long fibers is blown into the fiber collecting zone 25 defined between the collector 19 and the presser 21, the individual fibers are intertwined and stacked together to form the nonwoven fabric 6.

Figure 5A:
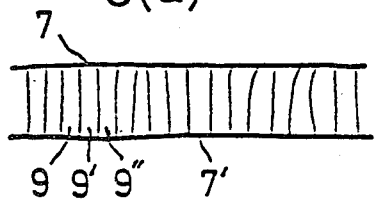
Figure 5B:
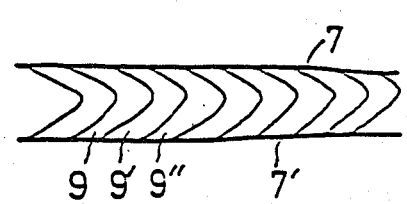
Figure 5C:
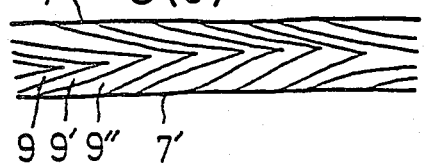
Figure 5D:
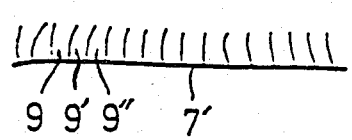

The longitudinal sectional plane of the nonwoven fabric 6 as shown at A in FIG. 3 may have various patterns as shown in FIGS. 5(a) to (c), which depend on the angle at which the fiber stream 18 is blown, and/or the relative position of the collector 19 and the presser 21. More specifically, if the fiber stream 18 is blown at a small angle, or if the collector 19 and the presser 21 are spaced a greater distance apart from each other, the thin layers 9, 9', 9" have a tendency to lie generally straightly as shown in FIG. 5(a). If, on the contrary, the fiber stream 18 is blown at a large angle, or the collector 19 and the presser 21 are brought closer to each other, the thin layers 9, 9', 9" each have an acutely bent shape as shown in FIG. 5(c).

The woven or nonwoven fabric to be laminated with the nonwoven fabric having the aforesaid specific structure is required to have a tissue which is sufficiently coarse to permit the very fine intertwined fibers in the latter mentioned nonwoven fabric to pass through, or fill the tissue. In this connection, the woven or nonwoven fabric to be laminated preferably has a basis weight of 5 to 200 g/m$^2$, and more preferably 30 to 100 g/m$^2$. Any woven fabric, net-like nonwoven fabric, perforated film, or the like may be used without any particular limitation, if it has the aforesaid structure.

Any polymer used in the art for making artificial leathers may be used for making the artificial leather of this invention. Preferred examples of the polymer include elastomers or elastic polymers, for instance, synthetic rubbers such as polyurethane, NBR and SBR, polyvinyl chloride, polyamide resins such as nylon 6, nylon 66 and methoxymethylated polyamide resins, acrylic polymers, or the copolymers thereof.

The nonwoven fabric having the aforesaid specific structure, or the nonwoven fabric laminate prepared by laminating a woven or nonwoven fabric as hereinabove described is usually subjected to compression in order to improve the intertwined arrangement of very fine single fibers in the artificial leather of this invention; and provide it with high flexibility and uniform strength.

The compression for the purpose of this invention may be performed by rolling at room temperature, or an elevated temperature lower than the softening point of the fibers in the nonwoven fabric, needle punching as known in the art, or liquid impingement employing, for example, a high speed liquid flow blown at a pressure of 5 to 50 kg/cm$^2$G against the nonwoven fabric or laminate placed on a support. Moreover, the nonwoven fabric is subjected to contraction, if required. The conditions for the contraction must be appropriately selected to suit the kind and properties of the fibers involved, but it may usually be performed with dry or wet hot air, warm water, or steam. An elastic polymer is incorporated into the intertwined nonwoven fabric by a customary dry or wet method in order to improve its nerve, and make it closer to natural leather in properties. For example, the nonwoven fabric substrate is immersed in a dimethylformamide solution of polyurethane, and then transferred into water, whereby the polyurethane is solidified. The use of too much elastic polymer results in the formation of a rubber-like product, and impairs the hand which an artificial leather is desired to have. Therefore, the elastic or elastomeric polymer should be used in the amount of 5 to 150% by weight, preferably 5 to 80% by weight, based on the weight of the nonwoven fabric substrate.

The artificial leather of this invention may also be prepared by any method known in the art for manufacturing artificial leathers. For example, it is possible to prepare a thick nonwoven fabric, slice it into a number of sheets, and incorporate an elastic polymer thereinto. It is also possible to incorporate an elastic polymer into a thick non-woven fabric and slice it into a plurality of sheets. It is further possible to employ a method of raising nap on the surface of the nonwoven fabric with sandpaper or a wire brush to provide a suede or velour finish, or a method of coating a highly concentrated polyurethane solution on the surface of the nonwoven fabric, and solidifying it to thereby form a grained layer on the artificial leather. Other various methods for coloring or embossing the surface of the artificial leather may also be employed.

The invention will now be described in further detail with reference to examples.

EXAMPLE 1

A web having a basis weight of 330 g/m$^2$ was prepared by using nylon 6 in the apparatus shown in FIG. 6. The web had a cross-sectional structure as shown in FIG. 5 at (c), and an average fiber diameter of 4.5μ.

The web was needle punched in order to provide longitudinally and transversely uniform strength and flexibility, whereby a nonwoven fabric substrate composed of more fully intertwined fibers was obtained.

The nonwoven fabric substrate thus obtained was immersed in a dimethylformamide solution containing 10% by weight of polyurethane, and mangled to a rate of 400%. Then, the substrate was immersed in an aqueous solution containing 30% by weight of dimethylformamide, whereby the polyurethane was solidified. After mangling, the substrate was immersed in warm water at 70° C., whereby the dimethylformamide was removed therefrom. After washing and drying, the substrate had its surface ground with sandpaper for raising nap, whereby there was obtained a suede-like artificial leather having a soft and dense surface which manifested the hand of natural leather, and excellent chalkiness.

EXAMPLE 2

The procedures of Example 1 were repeated for impregnating a web with polyurethane, washing and drying it. A dimethylformamide solution containing 25% by weight of polyurethane was applied on the surface of the substrate thus obtained by means of a knife coater. Then, the substrate was dipped in water for the solidification of polyurethane, whereby there was obtained a grained artificial leather which was comparable to the oxhide used as shoe leather.

EXAMPLE 3

The nonwoven fabric contained in accordance with the procedures of Example 1 was compressed by rolling at room temperature to form a nonwoven fabric substrate having a thickness of about 3 mm. Then, polyurethane was incorporated into the substrate as described in Example 1, whereby an artificial leather having a suede finish was obtained.

What is claimed is:

1. An artificial leather comprising a nonwoven fabric and a polymer filling the interstices of said nonwoven fabric, said nonwoven fabric consisting essentially of stacked and intertwined melt-blown long fibers forming thin intertwined layers extending between one surface of said nonwoven fabric or a part thereof and the other surface or a part thereof.

2. The artificial leather according to claim 1 wherein the polymer is an elastomer or elastomeric polymer.

3. The artificial leather according to claim 1 wherein the polymer is selected from the groups consisting of synthetic rubber such as polyurethane, NBR and SBR, polyvinyl chloride, polyamide resins such as nylon 6, nylon 66 and methoxymethylated polyamine resins, acrylic resins and copolymers thereof.

4. The artificial leather according to claim 1, 2 or 3 wherein the elastic or elastomeric polymer is present in an amount of from about 5 to 150% by weight based on the weight of the nonwoven fabric.

5. The artificial leather according to claim 1 wherein the nonwoven fabric is formed of fibers having a diameter of about 0.1 to about 30 microns.

6. The artificial leather according to claim 1 wherein the nonwoven fabric has a basis weight of about 5 to 2,000 g/m$^2$.

7. The artificial leather according to claim 1 wherein the nonwoven fabric has a thickness of about 0.5 to about 100 mm.

8. An artificial leather comprising a polyurethane supported in a nonwoven fabric, said nonwoven fabric consisting essentially of stacked and intertwined melt-blown long fibers having a diameter of about 0.1 to about 30 microns, forming thin intertwined layers extending between one surface or part thereof and the other surface of said nonwoven fabric or part thereof, said polyurethane being present in the amount of about 5 to about 150% by weight based on the weight of the nonwoven fabric, said nonwoven fabric having a basis weight of about 5 to about 2,000 g/m² and a thickness of about 0.5 to about 100 mm.

9. An artificial leather comprising a polymer supported in a nonwoven fabric laminate comprising a woven or nonwoven fabric laminated to a nonwoven fabric, said latter mentioned nonwoven fabric consisting essentially of stacked and intertwined melt-blown long fibers forming thin intertwined layers extending between one surface of said latter mentioned nonwoven fabric or a part thereof and the other surface of said latter mentioned nonwoven fabric or a part thereof.

10. The artificial leather according to claim 9 wherein the polymer is present in an amount of from about 5 to about 150% by weight based on the weight of first mentioned nonwoven fabric.

11. The artificial leather according to claim 9 wherein the first mentioned nonwoven fabric is formed of fibers having a diameter of about 0.1 to about 30 microns.

12. The artificial leather according to claim 9 wherein the first-mentioned nonwoven fabric has a basis weight of about 5 to about 2,000 g/m².

13. The artificial leather according to claim 9 wherein the first-mentioned nonwoven fabric has a thickness of from about 0.5 to about 100 mm.

14. The artificial leather according to claim 9 wherein the woven or second mentioned nonwoven fabric has a basis weight of 5 to 200 g/m².

15. An artificial leather comprising a polyurethane supported in a nonwoven fabric laminate comprising a woven or nonwoven fabric laminated to a nonwoven fabric, said latter mentioned nonwoven fabric consisting essentially of stacked and intertwined melt-blown long fibers forming thin intertwined layers extending between one surface of said latter mentioned nonwoven fabric or a part thereof and the other surface of said latter mentioned nonwoven fabric or a part thereof, said polyurethane being present in the amount of from about 5 to about 15% by weight based on the weight of latter mentioned nonwoven fabric, said latter mentioned nonwoven fabric being formed of fibers having a diameter of about 0.1 to about 30 microns, the said fabric having a basis weight of about 5 to about 2,000 g/m² and a thickness of about 0.5 to about 100 mm, said woven fabric or first mentioned nonwoven fabric having a basis weight of 5 to 200 g/m².

16. The artificial leather of claim 1 wherein said nonwoven fabric is compressed.

17. The artificial leather of claim 8 wherein said nonwoven fabric is compressed.

18. The artifical leather of claim 9 wherein said nonwoven fabric is compressed.

19. The artificial leather of claim 9 wherein the laminate is compressed.

20. The artificial leather of claim 15 wherein the woven or first mentioned nonwoven fabric is compressed.

21. The artificial leather of claim 15 wherein the laminate is compressed.

* * * * *